United States Patent [19]

Abe

[11] Patent Number: 4,869,221
[45] Date of Patent: Sep. 26, 1989

[54] ENGINE IGNITION TIMING CONTROL SYSTEM

[75] Inventor: Kunihiro Abe, Higashimurayama, Japan

[73] Assignee: Fuji Jukogyo Kabushiki Kaisha, Tokyo, Japan

[21] Appl. No.: 233,444

[22] Filed: Aug. 17, 1988

[30] Foreign Application Priority Data

Aug. 28, 1987 [JP] Japan ................................ 62-215976

[51] Int. Cl.$^4$ .............................................. F02P 5/14
[52] U.S. Cl. ..................................... 123/414; 123/612
[58] Field of Search ............... 123/414, 612, 416, 417, 123/418, 406, 412

[56] References Cited

U.S. PATENT DOCUMENTS

| 4,365,602 | 12/1982 | Stiller et al. | 123/414 |
| 4,499,875 | 2/1985 | Katayama et al. | 123/414 |
| 4,502,441 | 3/1985 | Katayama et al. | 123/414 |
| 4,615,318 | 10/1986 | Imoto et al. | 123/414 |
| 4,644,917 | 2/1987 | Yakuwa et al. | 123/414 |
| 4,787,355 | 11/1988 | Maeda | 123/414 |

Primary Examiner—Raymond A. Nelli
Attorney, Agent, or Firm—Beveridge, DeGrandi & Weilacher

[57] ABSTRACT

A control unit for receiving and processing crank pulses, cam pulses, and a pressure signal and generating ignition control signals on the basis of the intake pipe pressure, the crankshaft rotational speed, and the crank angle; and a driving circuit for operating in response to the ignition control signals to drive the engine ignition coil in ignition operation.

3 Claims, 5 Drawing Sheets

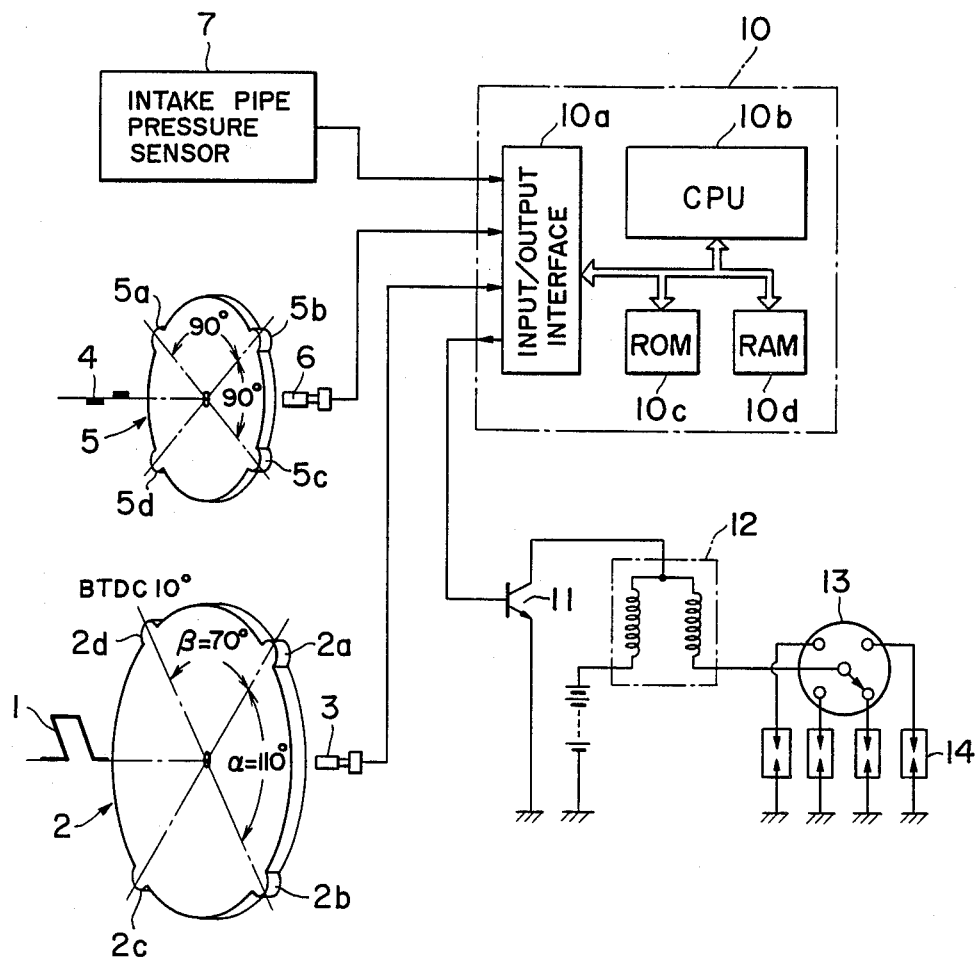
F I G. 1

ENGINE IGNITION TIMING CONTROL SYSTEM

BACKGROUND OF THE INVENTION

This invention relates generally to internal-combustion engines and ignition systems thereof and more particularly to control of ignition timing of such engines. More specifically, the invention relates to an engine ignition timing control system which detects data such as the cam angle or the crank angle from a reference position in an engine and, in response, sets the ignition or firing timing.

In the prior art, in an ignition control system of the time-control type utilizing crank angle signals of even pitch, the accuracy of the reference position detection is improved by the measure of counting the angle signals with standard angle signals as reference thereby to increase the number of pulses, as set forth, for example, in Japanese Laid-Open Patent Publication No. 36961/1979. Furthermore, as disclosed in Japanese Laid-Open Patent Publications Nos. 183304/1984 and 61617/1985, a measure, for this purpose, of setting specific pulse positions at particularly narrow settings is proposed. Another measure proposed in Japanese Laid-Open Patent Publication No. 47877/1985 comprises removal of one specific pulse position.

In the method of the reference cited first above Japanese Laid-Open Patent Publication No. 36961/1979, however, in the case where the number of pulses is increased, it is necessary to carry out a measure for preventing misfiring, whereby the improvement in accuracy is not as much as would be expected from the increase in the number of pulses. Furthermore, the hardware for processing these pulses entails an increase in cost, and, if the processing of the pulses is imposed on the software in order to avoid this increase in cost, the interrupted overhead becomes large, whereby the main control variable can be reduced.

Furthermore, the latter of the above references (Japanese Laid-Open Patent Publication Nos. 183304/1984, 61617/1985, and 47877/1985) merely teach the use of means for carrying out cylinder discrimination and provide no contribution whatsoever to improvement of precision of ignition timing.

SUMMARY OF THE INVENTION

An object of this invention, which I have made in order to solve the above described problems, is to provide an engine ignition timing control system (hereinafter referred to as timing control system or merely control system) of time control type which is capable of controlling engine ignition timing with high precision without increasing the load on the software and hardware of the system.

According to this invention, briefly summarized, there is provided an ignition timing control system for an engine having a crankshaft, a camshaft, and an ignition coil connected to apply sparking voltage via a distributor to spark plugs of cylinders, said control system comprising: a first rotary structure fixed coaxially to said crankshaft and having a plural even number of first detectable means disposed therearound at angular positions such that pairs of said means are diametrically opposed and that adjacent means are spaced angularly apart by at least two different specific angles; a second rotary structure fixed coaxially to said camshaft and having a plurality of second detectable means disposed therearound at positions spaced angularly apart at specific angles; a first sensor confronting said first rotary structure in rotation to detect said first detectable means thereby to detect crank angles and generate corresponding crank pulses; a second sensor confronting said second rotary structure in rotation to detect said second detectable means thereby to detect cam angles and generate corresponding cam pulses; a third sensor for detecting the pressure within the engine intake pipe and generating a corresponding detecting signal; a control unit for receiving and processing said crank pulses, cam pulses, and said detection signal respectively from said three sensors and generating control signals; and a driving circuit for operating in response to said control signals to drive said ignition coil in ignition operation.

The engine ignition timing control system according to this invention of the above described organization operates: to detect the passage of the first detectable means by means of the first (crank angle) sensor, which generates corresponding pulses; to determine discriminately whether a crank angle between the first detectable means is a wide angle (for example, 110 degrees) from the cam angle signals of equal intervals (for example 90 degrees) detected by the second (cam angle) sensor; to calculate the cyclic period (time) $T_{110}$ in the interval of the crank angle of 110 degrees from the difference between the timing of the two consecutive crank pulses indicating this wide angle; to then determine the sparking timing $T_{SPK}$ from the sparking angle $ANG_{SPK}$ previously calculated on the basis of the engine rotational speed, the intake pipe negative pressure, and other variables and the period $T_{110}$; and to set this sparking angle $ANG_{SPK}$ in a timer, which operates, when that sparking timing is reached, to output a sparking or firing signal to the driving circuit.

The nature, utility, and further features of this invention will be more clearly apparent from the following detailed description when read in conjunction with the accompanying drawings, briefly described below.

BRIEF DESCRIPTION OF THE DRAWINGS

In the accompanying drawings:

FIG. 1 is a combination of a schematic perspective view, a block diagram, and a circuit diagram showing the entire organization of one example of the engine ignition timing control system of this invention;

DETAILED DESCRIPTION OF THE INVENTION

Figure 2:
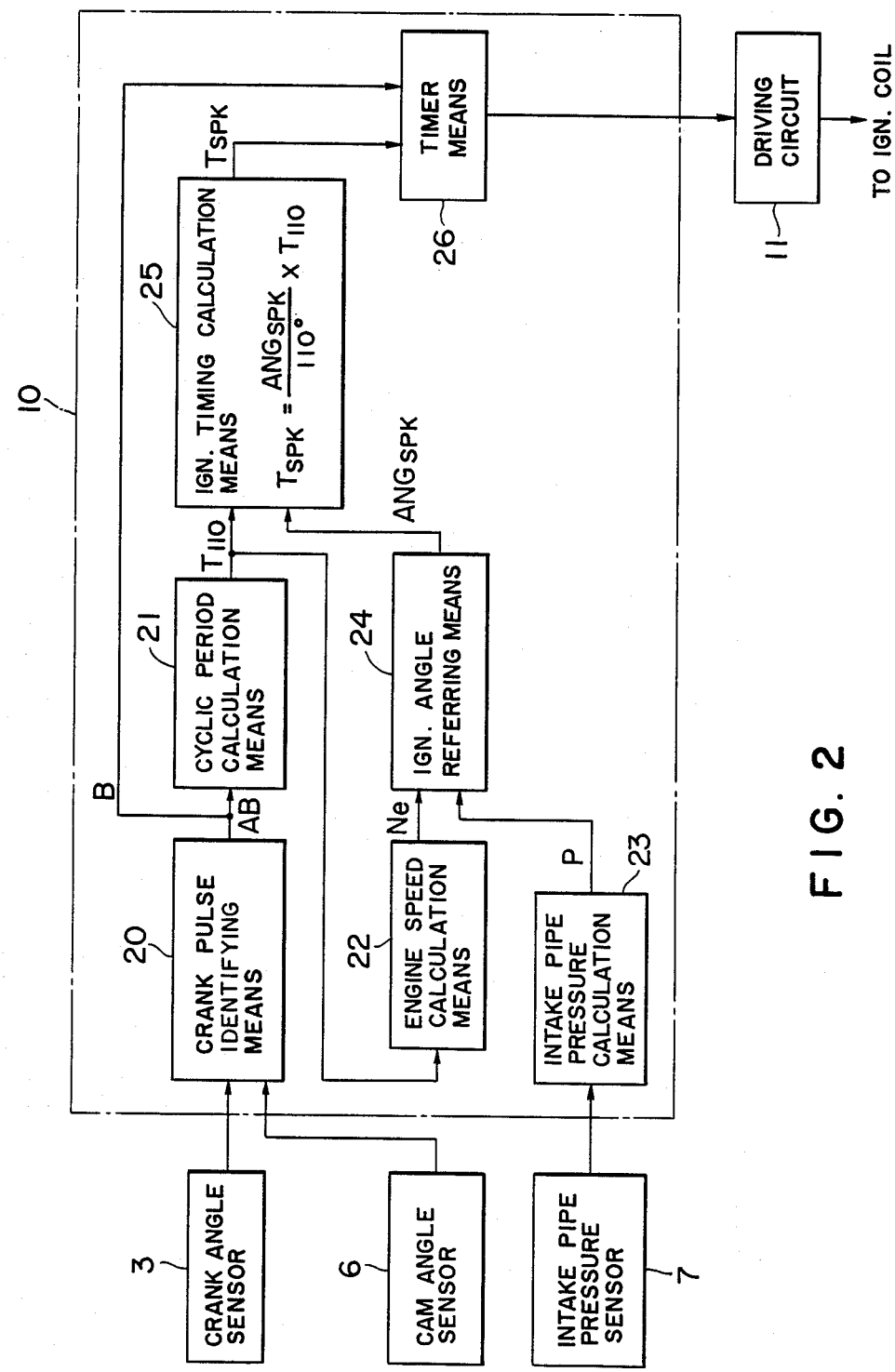
FIG. 2 is a block diagram of the electrical elements and their organization of the control system.

Referring first to FIG. 1, showing the entire organization of one example of the control system according to this invention, the system has a first rotary structure comprising a crank plate 2 of disc shape fixedly and coaxially mounted on the crankshaft 1 of an engine for detecting the crank angular position. This crank plate 2 is provided around its outer periphery with four projections 2a, 2b, 2c and 2d for functioning as detectable means for causing generation of pulses at specific angular positions $\alpha$ and $\beta$ of the crank angle. A crank angle sensor 3 for detecting these projections as they pass by and generating corresponding pulse signals is installed to confront the periphery of the crank plate 2.

Separately, a second rotary structure comprising a cam plate 5 of disc shape for detecting the camshaft angular position is fixedly and coaxially mounted on the camshaft 4 which undergoes one revolution for every two revolutions of the crankshaft. This cam plate 5 has around its outer periphery four projections 5a, 5b, 5c and 5d spaced angularly at equal pitch intervals of 90 degrees for causing the generation of pulses at specific angular positions of the cam angle. These four projections 5a, 5b, 5c and 5d function as detectable means for the purpose of classifying the aforementioned crank angle pulses into two kinds, pulses A and B. A cam angle sensor 6 is installed to confront the periphery of this cam plate 5. A cylinder identifying projection (not shown) is provided on the cam plate 5.

The detection pulse signals outputted by the above mentioned sensors 3 and 6, together with a detection signal from an intake pipe pressure sensor 7 for detecting the pressure within the intake pipe, are introduced as input into a control unit 10 comprising a microcomputer for carrying out ignition timing control. This control unit 10 comprises, essentially, an input/output interface 10a, a CPU 10b, a ROM 10c in which control programs and the like are stored, a RAM 10d for temporary storing data, and the like and, according to a specific program, computes ignition timing. The resulting ignition signals are sent to a driving circuit 11 comprising power transistors and the like to switch this driving circuit from ON to OFF thereby to cause, by way of an ignition coil 12 and a distributor 13, an ignition voltage to be applied successively to spark plugs 14 of respective cylinders.

Figure 3:
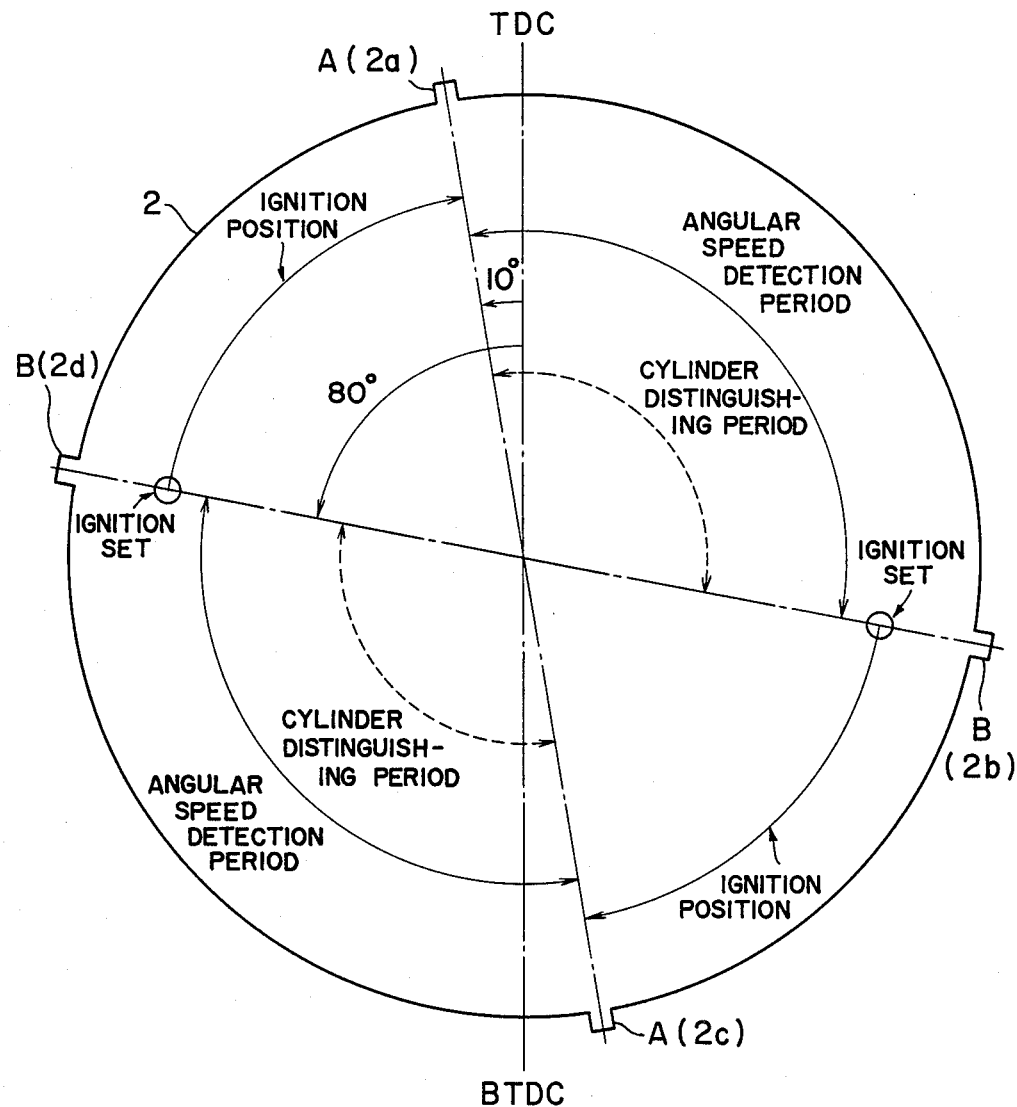
FIG. 3 is a diagram indicating detection positions of crank angles.
Figure 4:
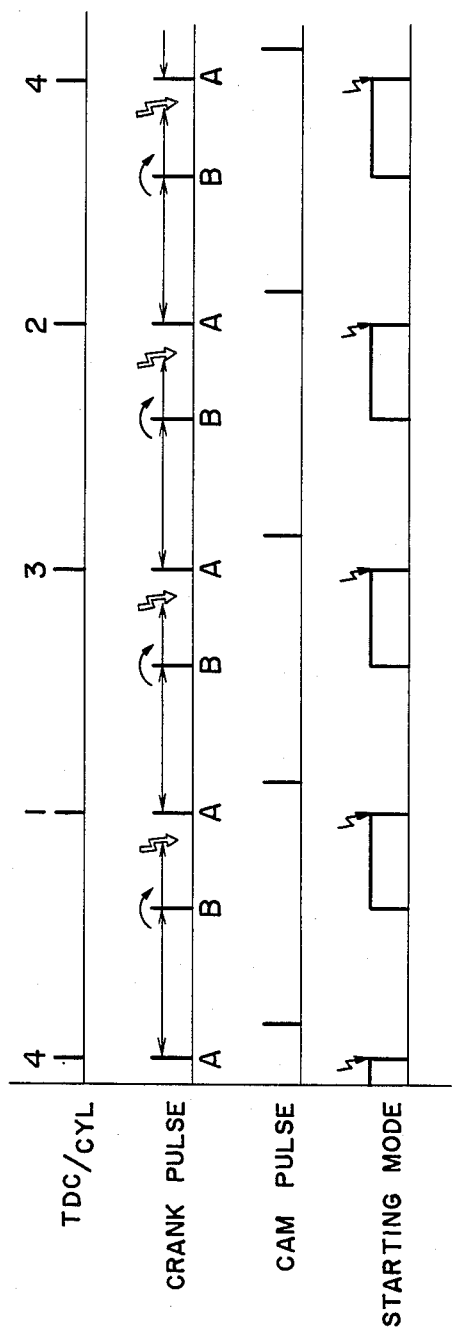
FIG. 4 is a time chart of crank pulses and cam pulses.

As indicated in FIGS. 1 and 3, the four projections 2a, 2b, 2c and 2d provided around the crank plate 2 are classified into two kinds A (2a and 2c) and B (2b and 2d). The projection 2a is positioned 10 degrees before the top dead center (TDC); the projection 2b is positioned at a crank angle of $\alpha=110$ degrees from this 2a position; the projection 2c is positioned at a further crank angle of $\beta=70$ degrees from 2b; and the projection 2d is positioned at a still further crank angle of $\alpha=110$ degrees from 2c. These two kinds of projections A and B are distinguishable from one another as follows. Since the cam angle sensor 6 for detecting the projections 5a through 5d of the cam plate 5 is so positioned that it generates a pulse signal in the interval of a wide crank angle of $\alpha=110$ degrees as indicated in FIG. 4, the pulse signal from the cam angle sensor 6 enters the intermittent line region of FIG. 3 and is thereby identified.

Referring now to FIG. 2 indicating the organization of the aforementioned control unit 10, the aforedescribed pulse signals from the crank and cam angle sensors 3 and 6 are fed as input into a crank pulse identifying means 20 of this control unit 10. The crank pulse identifying means 20 determines, on the basis of a pulse signal from the cam angle sensor 6, whether the pulse signal from the crank angle sensor 3 is A (2a, 2c) or whether it is B (2b, 2d) and transmits its output to a cyclic period calculation means 21 and to a timer means 26. The cyclic period calculation means 21 operates according to the difference between the timing at which a projection A is detected and the timing at which the immediately succeeding projection B is detected to determine a cyclic period $T_{110}$, that is, the angular speed information of the crankshaft 1. This angular speed information $T_{110}$ is transmitted to an engine (tachometric speed calculation means 22, where it is calculated as the engine speed Ne.

Separately, the intake pipe pressure signal from the intake pipe pressure sensor 7 is received by an intake pipe pressure calculation means 23 which thus calculates the intake pipe pressure P corresponding to the engine load. On the basis of this pressure P and the engine speed Ne, an ignition angle referring means 24 determines the ignition angle, or angle of sparking, $ANG_{SPK}$ according to map referring, for example, and transmits this as output to an ignition timing calculation means 25.

This ignition timing calculation means 25 determines the ignition timing $T_{SPK}$ from the following equation (1) With the input ignition angle $ANG_{SPK}$ as the time interval from the timing the projection B indicating the reference position was detected according to the cyclic period $T_{110}$, that is, the crank angle speed information.

$$T_{SPK} = (ANG_{SPK}/110°) \times T_{110} \quad (1)$$

The ignition timing $T_{SPK}$ thus determined is set in the timer means 26, which also receives the output of the crank pulse identifying means 20 and starts time counting according to the pulse signal B of the projection B (2b, 2d) identified by the crank pulse identifying means 20. Then, when the ignition or sparking timing $T_{SPK}$ thus set is reached, the timer means 26 transmits as output an ignition timing signal to the aforementioned driving circuit 11 to turn off the power transistor thereof and apply the ignition voltage to the spark plug 14 of the pertinent cylinder.

By this control operation, the signal of the projection B (2b, 2d) indicating the standard or reference position approaches the actual ignition angle, whereby the ignition accuracy improves remarkably even under extreme conditions such as at the time of acceleration when the engine speed fluctuates greatly.

Figures 5, 6:
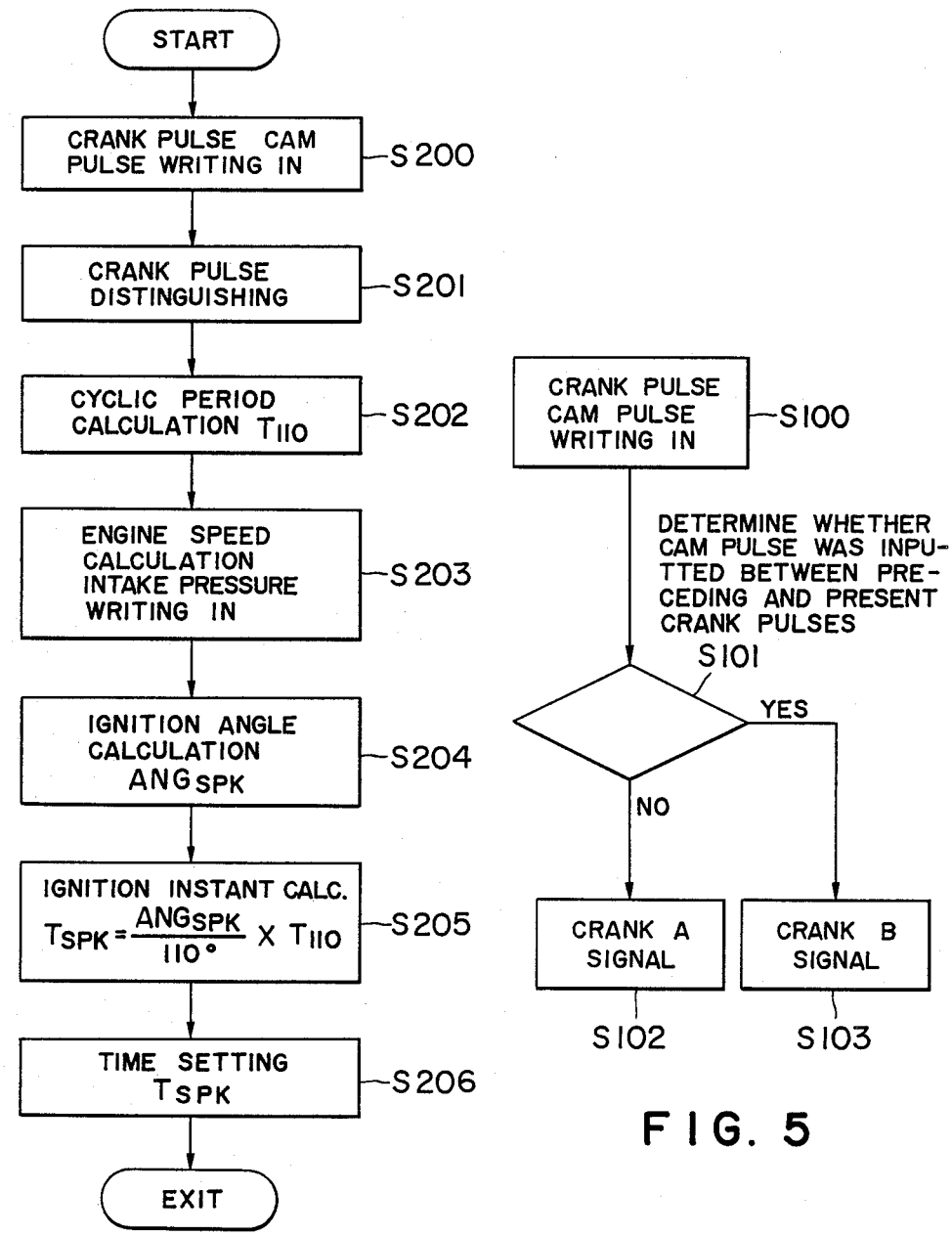
FIG. 5 is a flow chart indicating an operation for identifying crank pulses.
FIG. 6 is a flow chart indicating the operation of determining ignition (or firing or sparking) timing.

The above described operation will now be considered further with respect to flow charts as shown in FIGS. 5 and 6. Referring first to FIG. 5 indicating the crank pulse identifying operation, a crank pulse from the crank angle sensor 3 and a cam pulse from the cam angle sensor 6 are inputted in step S100. In the succeeding step S101, whether or not a cam pulse has been introduced as input between the preceding and present crank pulses is determined. If a cam pulse has not been inputted, it is then judged in step S102 that the present crank pulse is due to a projection A, whereas if a cam pulse has been inputted, it is judged in step S103 that the present crank pulse is due to a projection B, that is, that it is a reference signal.

Then, in the ignition timing calculating operation as indicated in FIG. 6, a crank pulse and a cam pulse are first inputted in step S200. Then, in step S201, the crank pulse A or B is identified by the operation indicated in the flow chart of FIG. 5. Then, in step S202, cyclic period $T_{110}$, which is the crank angular speed information, is calculated from the difference between the timing when the crank pulse A is inputted and the timing of the crank pulse B which is inputted next.

In the succeeding step S203, the engine speed Ne is calculated on the basis of the cyclic period $T_{110}$ thus calculated, and at the same time the intake pipe pressure P (or the intake air flow rate measured by an air flow meter) corresponding to the engine load is inputted. In the next step S204, the ignition angle $ANG_{SPK}$ is calculated on the basis of the engine speed Ne and the intake pipe pressure P. Then, in step S205, the ignition timing $T_{SPK}$ is determined from equation (1) with the ignition angle $ANG_{SPK}$ as the time from the crank pulse B, that is, the reference signal, and is set in the timer means 26. Thereafter, as described hereinbefore, the timer means 26 starts time counting according to the crank pulse B and, when the ignition or sparking timing $T_{SPK}$ is reached, outputs an ignition signal. As this operation is repeated for every half revolution of the crankshaft 1, the spark plugs 4 of the respective cylinders are successively fired.

It is to be understood that this invention is not limited to the details of the example of the invention described above. For example, the detectable means are not restricted to projections but may be slits formed in the disc-shaped plates.

As described above with respect to one example, this invention provides an engine ignition timing control system in which two projections A are provided symmetrically at positions that are 10 degrees before TDC of the crank plate, projections B being respectively provided at positions that are 110 degrees from the projection A positions, and the cyclic period which is the crank angular speed information is calculated from the difference between the timing when the crank pulse A identified by a cam pulse is inputted and the timing when the crank pulse B is next inputted, the ignition timing with the crank pulse B as the reference position being calculated.

Therefore, the crank pulse B, which is the reference position, can be made to approach the actual ignition angle, and, moreover, the ignition timing accuracy is remarkably improved without increasing the load on the software and the hardware. Furthermore, since the angle at which the cam pulse is inputted is widened, advantageous features such as improvement of the degree of freedom in software design with respect to the cam signal are attained.

What is claimed is:

1. An ignition timing control system for an engine having a crankshaft, a camshaft, and an ignition coil connected to apply sparking voltage via a distributor to spark plugs of cylinders, said control system comprising:

a first rotary structure fixed coaxially to said crankshaft and having a plurality even number of first pulse detectable means disposed therearound at angular positions such that pairs of said pulse detectable means are diametrically opposed and that adjacent pulse detectable means are spaced angularly apart by at least two different specific angles;

a second rotary structure fixed coaxially to said camshaft and having a plurality of second pulse detectable means disposed therearound at positions spaced angularly apart at specific angles;

a first sensor confronting said first rotary structure in rotation to detect said first pulse detectable means thereby to detect crank angles and generate corresponding crank pulses;

a second sensor confronting said second rotary structure in rotation to detect said second pulse detectable means thereby to detect cam angles and generate corresponding cam pulses;

a third sensor for detecting the pressure within the engine intake pipe and generating a corresponding detection signal;

a control unit for receiving and processing said crank pulses, cam pulses, and said pressure signal respectively from said three sensors and generating ignition control signals on the basis of the intake pipe pressure, the crankshaft rotational speed, and the crank angle; and a driving circuit for operating in response to said control signals to drive said ignition coil in ignition operation.

2. The ignition timing control system according to claim 1 wherein the setting of the cam angle detection position of each said cam angle is carried out within a wide angle of an uneven pitch in the crank angle wherein the angle between said pulse detectable means of said first rotary structure is large.

3. An ignition timing control system according to claim 1 wherein said control unit comprises: a crank pulse identifying means for receiving said crank pulses and cam pulses respectively from said first and second sensors and identifying, on the basis of a cam pulse, the identity of the first pulse detectable means originating a crank pulse; a cyclic period calculation means operating in response to the resulting output of the crank pulse identifying means to calculate a cyclic period T as angular information of the crankshaft from the difference between the timing of detection of two continuous means of said first pulse detectable means with a wide angle therebetween; an engine speed calculation means for calculating the engine speed Ne from said cyclic period T thus calculated; an intake pipe pressure calculation means operating in response to the intake pipe pressure signal from said third sensor to calculate the intake pipe pressure P corresponding to the engine load; an ignition angle referring means for determining, from said pressure P and said engine speed Ne, the ignition angle, or angle of sparking, $ANG_{SPK}$; an ignition timing calculation means for calculating the ignition timing $T_{SPK}$ with said angle $ANG_{SPK}$ as the time interval from the timing of detection of said first pulse detectable means indicating a reference position according to said cyclic period T; and a timer means in which said ignition timing $T_{SPK}$ is set, and which starts time counting upon receiving said output of said crank pulse identifying means, operating, when the count reaches said ignition timing TsPK, to transmit an ignition timing signal, as one of said control signals, to said driving circuit, whereby an ignition voltage is applied to the pertinent spark plug.

* * * * *